(12) United States Patent
Bocus et al.

(10) Patent No.: US 10,725,143 B2
(45) Date of Patent: Jul. 28, 2020

(54) 3D DIRECTION FINDING METHOD AND DEVICE THEREFORE

(71) Applicant: Kabushiki Kaisha Toshiba, Minato-ku (JP)

(72) Inventors: Zubeir Bocus, Bristol (GB); Ziming Zhu, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 242 days.

(21) Appl. No.: 15/938,642

(22) Filed: Mar. 28, 2018

(65) Prior Publication Data

US 2019/0302217 A1    Oct. 3, 2019

(51) Int. Cl.
  *G01S 3/48*    (2006.01)
(52) U.S. Cl.
  CPC ..................................... *G01S 3/48* (2013.01)

(58) Field of Classification Search
  CPC ..... G01S 3/48; G01S 3/46; G01S 3/043; G01S 3/023; G01S 5/06
  USPC ................................................ 342/442
  See application file for complete search history.

(56) References Cited

U.S. PATENT DOCUMENTS

| | | | |
|---|---|---|---|
| 9,612,337 B2* | 4/2017 | Floch | G01S 19/22 |
| 2018/0136309 A1* | 5/2018 | Lo Monte | G01S 13/82 |

* cited by examiner

*Primary Examiner* — Harry K Liu
(74) *Attorney, Agent, or Firm* — Oblon, McClelland, Maier & Neustadt, L.L.P.

(57) ABSTRACT

A method of determining a direction of arrival of a signal at a device comprising an antenna with multiple antenna elements, in a processor of the device configured to calculate an average signal for each antenna element based on the signal received at the antenna element over N time slots, determine respective phases of the average signals and determine at least one of an azimuth and elevation angle of the signal using the determined phases and information of the location of the antenna elements.

10 Claims, 4 Drawing Sheets

3D DIRECTION FINDING METHOD AND DEVICE THEREFORE

FIELD

Embodiments described herein relate generally to the computationally efficient determination of the angle or direction of arrival of a signal.

BACKGROUND

A feature of interest in the development of the low energy Bluetooth standard is direction finding, where a Bluetooth device equipped with multiple antenna elements can identify the direction of arrival of a received signal. Algorithms for the estimation of signal arrival angles or direction have previously been proposed. For Bluetooth low energy (BLE) devices, it is however necessary that the algorithm be computationally efficient.

Direction finding (DF) methods enable a device to determine the angle of arrival (AoA) or angle of departure (AoD) of signals by exploiting the differences in the received signal across different antenna elements. These methods can be classified as either spectral-based algorithm such as Bartlett, MUSIC and Capon or parametric-based algorithms such as Maximum Likelihood (ML). The techniques differ in performance and computational complexity.

While the complexity of DF schemes is manageable for a number of scenarios, for future low energy, low complexity devices with limited processing capabilities, the existing methods may not be feasible. This problem is exacerbated in 3D DF where the elevation angles also need to be computed.

Most of the conventional AoA/AoD algorithms in the array processing literature do not exploit the waveforms of the transmit signal. From the received signals at multiple antennas across several samples the sample covariance matrix may be derived. This covariance matrix is then used to derive a 'spectrum' wherein peaks correspond to the angles of interest.

In the following, embodiments will be described with reference to the drawings in which.

DETAILED DESCRIPTION

Figure 1:
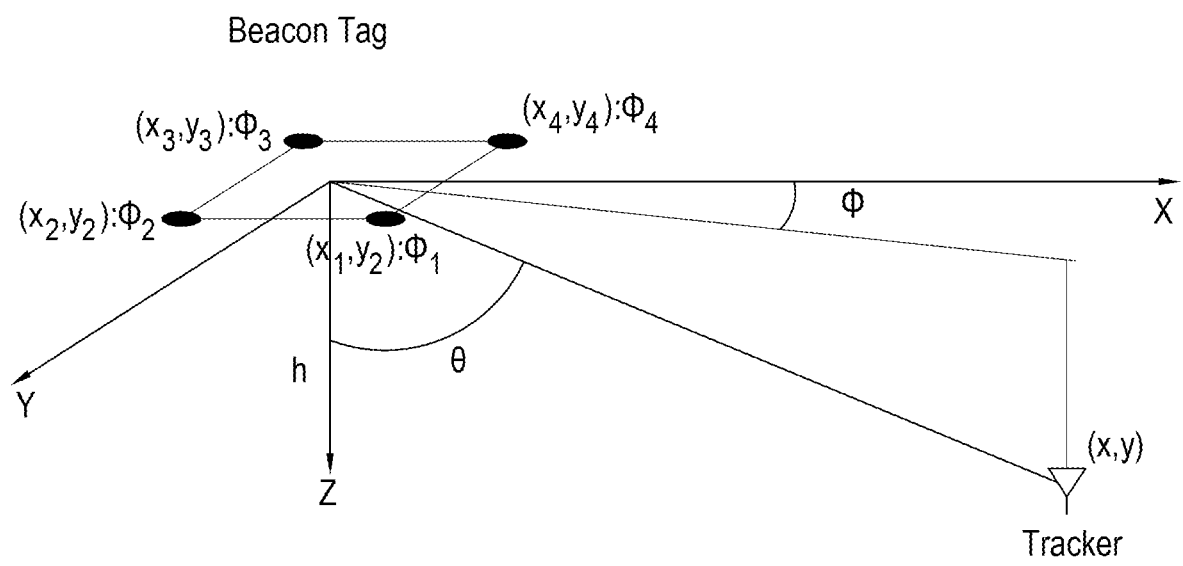
FIG. 1 shows a model of a system comprising 4 antenna elements alongside a signal source to be tracked with the relevant elevation θ and azimuth φ angles.

According to an embodiment there is provided a method of determining a direction of arrival of a signal at a device comprising an antenna with multiple antenna elements, in a processor of the device configured to calculate an average signal for each antenna element based on the signal received at the antenna element over N time slots, determine respective phases of the average signals and determine at least one of an azimuth and elevation angle of the signal using the determined phases and information of the location of the antenna elements.

The method may further comprise defining, as two candidate azimuth angles, a determined azimuth angle and an angle spaced apart from the determined azimuth angle by 180 degrees and using a spectral-based direction finding algorithm or a parametric-based direction finding algorithm to decide between the candidate azimuth angles.

The values of the signal received over the N time slots can be identical.

The average may be calculated as a weighted average of the signal received over the N time slots if values of the signal received over the N time slots are not identical.

Ratios of averaged signals received through different antenna elements may be formed. The phase determination may be based on the ratios.

The information of the location of the antenna elements can be provided in a matrix. A vector comprising the phases of the averaged signals may be left-multiplied with a pseudo inverse of the matrix.

A determined angle of arrival of the signal may be output to a computing system.

According to a further embodiment there is provided a device comprising an antenna with multiple antenna elements and a processor configured to calculate an average signal for each antenna element based on the signal received at the antenna element over N time slots, determine respective phases of the average signals and determine at least one of an azimuth and elevation angle of the signal using the determined phases and information of the location of the antenna elements.

According to another embodiment there is provided a non-transitory storage medium comprising computer program instructions, the computer program instructions, when executed by the processor configured to cause the processor to perform any of the aforementioned methods.

An advantage of the embodiments is the lower complexity in finding desired angles. As opposed to searching over all possible combinations of angles, a closed-form approximation to the desired solutions is provided.

Known methods for determining the angle of arrival of a signal at a multi-antenna array include Bartlett, MUSIC and Capon. From the received signals, the mentioned schemes compute the sample covariance matrix as:

$$\hat{R}_{ss} = \frac{1}{N}\sum_{t=1}^{N} s(t)s^{H}(t). \tag{1}$$

wherein s(t) is the signal transmitted at time instant t, $s^H(t)$ is the conjugate transpose of the signal transmitted at time instant t and N is the number of time slots over which the signal is received.

Computing the covariance matrix $\hat{R}_{ss}$ requires $$\frac{NK}{2}(K+1)$$

complex multiplications, $$\frac{K}{2}(N-1)(K+1)$$

complex additions, $$\frac{K}{2}(K+1)$$

divisions and $$\frac{K}{2}(K-1)$$

complex conjugate operations. In the Bartlett method for instance, the angles of interest are obtained from the sample covariance matrix by solving the following optimizations problem:

$$\arg\max_{0\leq\theta<180, 0\leq\phi<360} a^H(\theta, \phi)\hat{R}_{ss}a(\theta, \phi). \tag{2}$$

For simple, low energy devices such as Bluetooth, performing such operations can be challenging.

The inventors have realised that the large computational complexity is primarily due to the large angle search space. FIG. 1 shows a system with a receiving device having K antenna elements. A signal received at the $k^{th}$ antenna from a single signal source without multi-path interference at time instant t is given by:

$$y_k(t) = \exp\left(-j\frac{2\pi}{\lambda}r_k^T w\right)s(t) + n_k(t) \tag{3}$$
$$= a_k(\theta, \phi)s(t) + n_k(t)$$

where $r_k=[x_k, y_k, z_k]^T$ represent the Euclidean coordinates vector of the kth antenna element (as shown in FIG. 1), $\lambda$ is the signal wavelength, $n_k(t)$ is the additive white Gaussian noise at antenna k and the steering vector w is:

$$w = \begin{bmatrix} \sin\theta\cos\phi \\ \sin\theta\sin\phi \\ \cos\theta \end{bmatrix} \tag{4}$$

The azimuth and elevation angles, $\phi$ and $\theta$, respectively are the unknown parameters of interest.

In vector notation the signal at the antenna array at time t is:

$$y=a(\theta,\phi)s(t)+n(t) \tag{5}$$

where $a(\theta, \phi)=[a_1(\theta, \phi), \ldots, a_K(\theta, \phi))]^T$. We assume N snapshots are available for estimating the angles of interest.

In conventional approaches for estimating the angles of arrival the transmit sequence s(t) are assumed to be unknown. However, in applications such as Bluetooth, s(t) can be assumed to be known. In fact in the Bluetooth standard the sequence is chosen to be:

$$s=[1,1,\ldots,1] \tag{6}$$

i.e., it consists of a N consecutive ones. It will, however, be appreciated that, in other standards, different predetermined/known transmit sequences may be used. Such structures can be exploited to reduce the complexity of direction finding algorithms.

In an angle-of-arrival (AoA) estimation scenario, where the receiver is equipped with K antennas arranged in a uniform circular array in which the receiver estimates the angle after N snapshots, in matrix notation, the signal received across K antennas over N time slots/samples/snapshots is:

$$Y=a(\theta,\phi)s+V \tag{7}$$

where $Y=[y(1), \ldots, y(N)]$, $y(n)=[y_1(n), \ldots, y_K(n)]^T$, V is the K×N complex matrix representing the additive Gaussian noise components, $$a(\theta, \phi) = [a_1(\theta, \phi), a_2(\theta, \phi), \ldots, a_K(\theta, \phi)]^T \text{ where}$$
$$a_k(\theta, \phi) = \exp\left(-j\frac{2\pi}{\lambda}r_k^T w\right).$$

With $s=[1, 1, \ldots, 1]$, Y can be viewed as the outcome of an experiment repeated N times. With zero mean additive white Gaussian noise and for large N:

$$E[Y]=E[a(\theta,\phi)s]=a(\theta,\phi) \tag{8}$$

Whilst large N are desirable, in practice the embodiment performed well with N as small as 7. Larger values of N are used in other embodiments.

The averaged received sequence is given by:

$$E[Y] = \tilde{y} = \sum_{t=1}^{N} y(t) \approx a(\theta, \phi) \tag{9}$$

With a single source with no multipath components or a strong line of sight component, the phase of individual entries of $\tilde{y}$ can be approximated to the phases of the corresponding entries in $a(\theta, \phi)$. This means the received signal $\tilde{y}$ can be represented as:

$$y=[e^{-ib_1}, e^{-ib_2}, \ldots, e^{-ib_K}]^T \tag{10}$$

where $b=[b_1, \ldots, b_K]^T$ corresponds to the phases of $\tilde{y}$. Thus:

$$b=Rw \tag{11}$$

where $$R = \frac{2\pi}{\lambda}\begin{bmatrix} r_1^T \\ \vdots \\ r_K^T \end{bmatrix}.$$

It follows that an estimate of w is given by:

$$\hat{w}=R^+b \tag{12}$$

where $R^+$ is the pseudo-inverse of R. This value is dependent only on the locations of the antenna elements and does not change over time. Thus, this matrix can be computed at design time and stored in the device memory to reduce the computational complexity of the system.

The azimuth and elevation angles can be solved by equating and solving:

$$\hat{w} = \begin{bmatrix} \hat{w}_1 \\ \hat{w}_2 \\ \hat{w}_3 \end{bmatrix} = \begin{bmatrix} \sin\hat{\theta}\cos\hat{\phi} \\ \sin\hat{\theta}\sin\hat{\phi} \\ \cos\hat{\theta} \end{bmatrix} \tag{13}$$

It follows that $$\hat{\phi} = \operatorname{atan}\frac{\hat{w}_2}{\hat{w}_1} \text{ and } \hat{\theta} = \operatorname{asin}\frac{\hat{w}_1}{\cos\hat{\phi}}.$$

In planar array configurations that may be used in Bluetooth devices, the z-coordinates of all the antenna elements, as well as $\hat{w}_3$ are zero. Moreover, given the planar configuration of the antenna array, it is not possible to distinguish whether the received signal is impinging on the array from above or the bottom. As such, we can set the range of $\hat{\theta}$ to [0, 90]. If $\hat{\theta} > 90°$ from the above equations, the estimate of the elevation angle is changed to $\hat{\theta} \to 180 - \hat{\theta}$.

In some cases, multiple feasible solutions may exist. For instance, observe that tan $\phi$=tan($\phi$)+180°). In such an instance, prior art subspace based algorithms, such as Bartlett or MUSIC, or any other maximum likelihood or subspace-based method, can be used to evaluate the cost function at these two angles, i.e., $\phi$ and $\phi$+180°. It was found that this can be achieved without performance degradation.

The angle that, according to the evaluated cost function, provides the optimal solution is selected as the desired angle. Compared to the conventional MUSIC algorithm, where the cost function has to be evaluated over all possible angles, the above described method is computationally very inexpensive. Assuming a step size of 1, the number of times the cost function is evaluated in the MUSIC or Bartlett method is 360*90=32400.

In the algorithm of the embodiment, instead on the sample covariance matrix, $$\tilde{y} = [\tilde{y}_1, \tilde{y}_2, \ldots, \tilde{y}_K]^T \text{ where } \tilde{y}_k = \frac{1}{N}\sum_{n=1}^{N} Y_{k,n}$$

and $Y_{k,n}$ is the entry in Y on row k, column n. The computation of the vector $\tilde{y}$ therefore consists only of NK complex additions and K divisions (K complex numbers divided by a scalar). Computing the phases of $\tilde{y}$ involves K real divisions and K inverse trigonometric operations. As mentioned above, the pseudo-inverse of the locations matrix can be precomputed and stored in the device. The remaining steps are also straight forward.

The signal received across K antenna elements may contain an additional phase term. The signal received at time t at antenna element k is then:

$$y_k(t) = \exp\left(-j\frac{2\pi}{\lambda}r_k^T w + \epsilon\right)s(t) + n_k(t) \quad (14)$$

where $\in$ is an additional phase term. Without loss of generality, it can be assumed that $\in$ is the same across all K antennas. One way of eliminating this unknown phase term is by taking the difference between successive rows of the matrices and perform the same operations as stated above. For example a difference matrix with K-1 rows can be defined as:

$$\overline{R} \triangleq \begin{bmatrix} r_1^T - r_2^T \\ r_2^T - r_3^T \\ \vdots \\ r_{K-1}^T - r_K^T \end{bmatrix} \quad (15)$$

Similarly, we define the vector:

$$\overline{y} \triangleq \begin{bmatrix} \tilde{y}_1/\tilde{y}_2 \\ \vdots \\ \tilde{y}_{K-1}/\tilde{y}_K \end{bmatrix} = \begin{bmatrix} e^{i\overline{b}_1} \\ \vdots \\ e^{i\overline{b}_{K-1}} \end{bmatrix} \quad (16)$$

Different definitions of difference matrices are also possible.

The initial estimate of azimuth and elevation angles is given by:

$$\hat{w} = \overline{R}^\dagger \overline{b} \quad (17)$$

Figure 2:
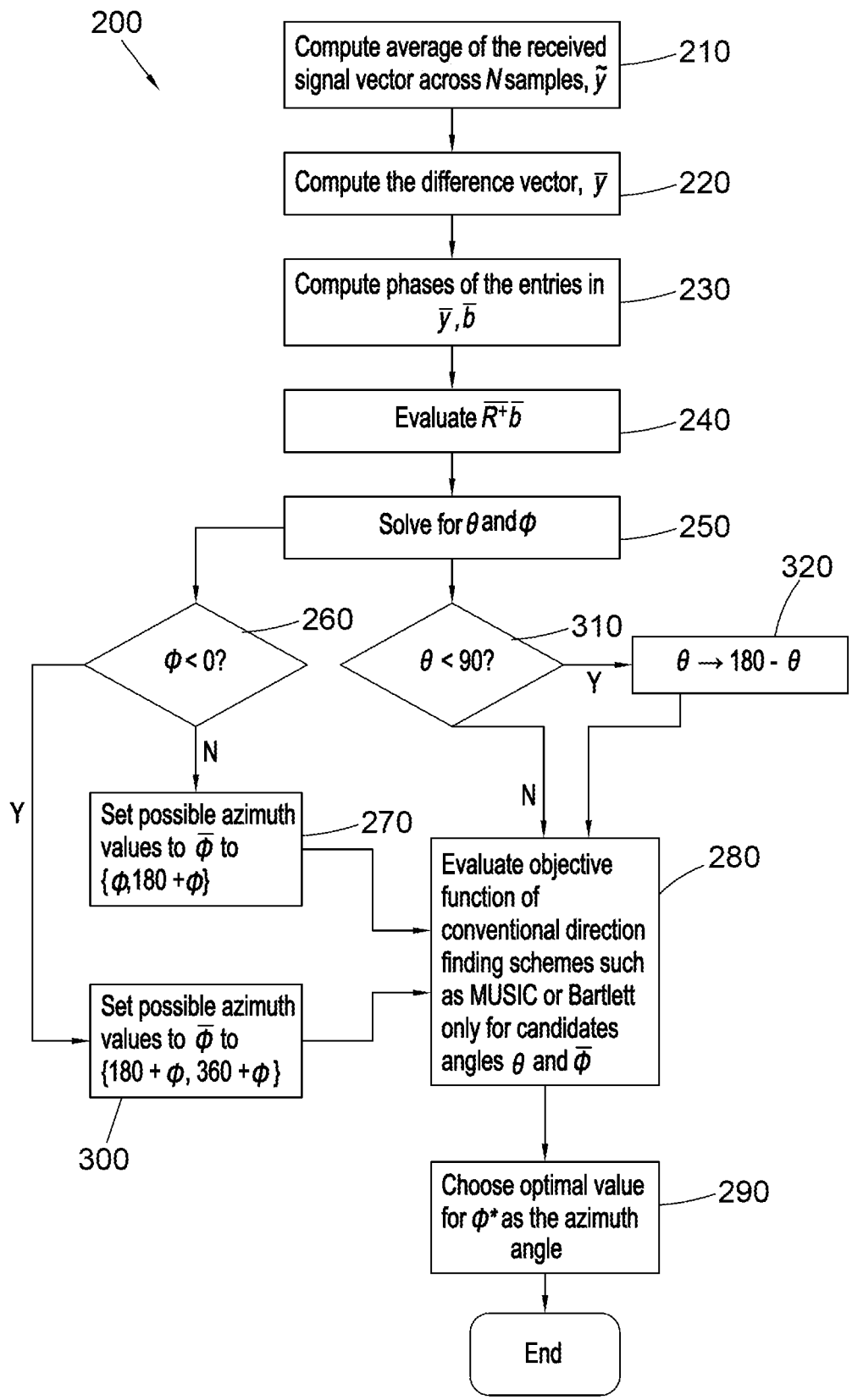
FIG. 2 shows a method according to an embodiment.

FIG. 2 shows illustrates a method 200 of an embodiment. In step 210 the average $\tilde{y}$ of the received signal sequences is calculated. As is the case in equation (8), this is done by summing all N elements of the received sequence. Whilst this sum could be divided by N doing so is not necessary as the calculated sum equally represents the average signal.

Based on the calculated average $\tilde{y}$ the difference vector $\overline{y}$ is calculated in step 220 based on equation (15) above. The phases $\overline{b}$ is of $\overline{y}$ are then computed in step 230 and used in steps 240 and 250 to solve for the azimuth and elevation angles. If the azimuth value is determined in step 260 to be smaller than 0 degrees then the possible azimuth angles are set (in step 270) to include not only the determined azimuth angle but also another possible azimuth angle spaced 180 degrees apart from the determined azimuth angle.

If the azimuth value is determined in step 260 not to be smaller than 0 degrees then the possible azimuth angles are set (in step 300) to include the determined azimuth angle plus 180 degrees as well as the determined azimuth angle plus 360 degrees.

In addition to steps 260, 270 and 300, in step 310 it is determined if the elevation angle is greater than 90 degrees. Should this be the case then the elevation angle that will be considered is 180 degrees minus the determined elevation angle (step 320).

The candidate azimuth angles and the elevation angle are used as input angles in a conventional direction finding scheme in steps 280 and 290 to determine which of the candidate angles is more likely to be the correct candidate angle.

In summary, in an embodiment the following steps are performed to calculate an angle of arrival.
1) The average of the received signal vector over N time instances is calculated
2) The phase of the average signal vector is calculated
3) The phase vector is then left-multiplied with the pseudo-inverse of the antenna location matrix and solved for the azimuth and elevation angles respectively
4) Should there be ambiguity then the search space to be covered by known direction finding algorithms can be reduced by using the known algorithm to decide which one of the candidate angles is the correct candidate angle or is at least most likely to be the correct candidate angle.

The above discussion has focussed on situations in which the signals received are known and identical. The embodiments described herein are, however, not limited to this situation. In alternative situations in which the received signal sequence is known but in which the signals received in the N time instances are not the same, the above discussed average can be calculated as a weighted average, so that the noise term is eliminated from the angle of arrival estimation in the same manner as discussed above.

Another embodiment of the proposed method could be to compute the phase difference between the signals received at the different antenna elements for each of the N samples and then take the average of the results. This will remove any effect due to different signals being transmitted at different time instants.

In embodiments the low complexity direction finding approach uses knowledge of a known transmit sequence. In the supplemental frame of Bluetooth low energy (BLE) transmissions, for instance, the transmit sequence is likely to be a constant signal. Under additive white Gaussian noise with zero mean, averaging the received sequence over multiple time instances 'filters' out the noise. The task of determining the azimuth and elevation angles then reduces to simpler operations. The method of the embodiments yield similar performance in the case of a single path as the conventional Bartlett algorithm over a wide range of signal-to-noise ratio values, while requiring much lower computational complexity. Moreover, the proposed method can used with existing algorithms such as MUSIC or Bartlett to reduce the search space of these algorithms.

Figure 3:
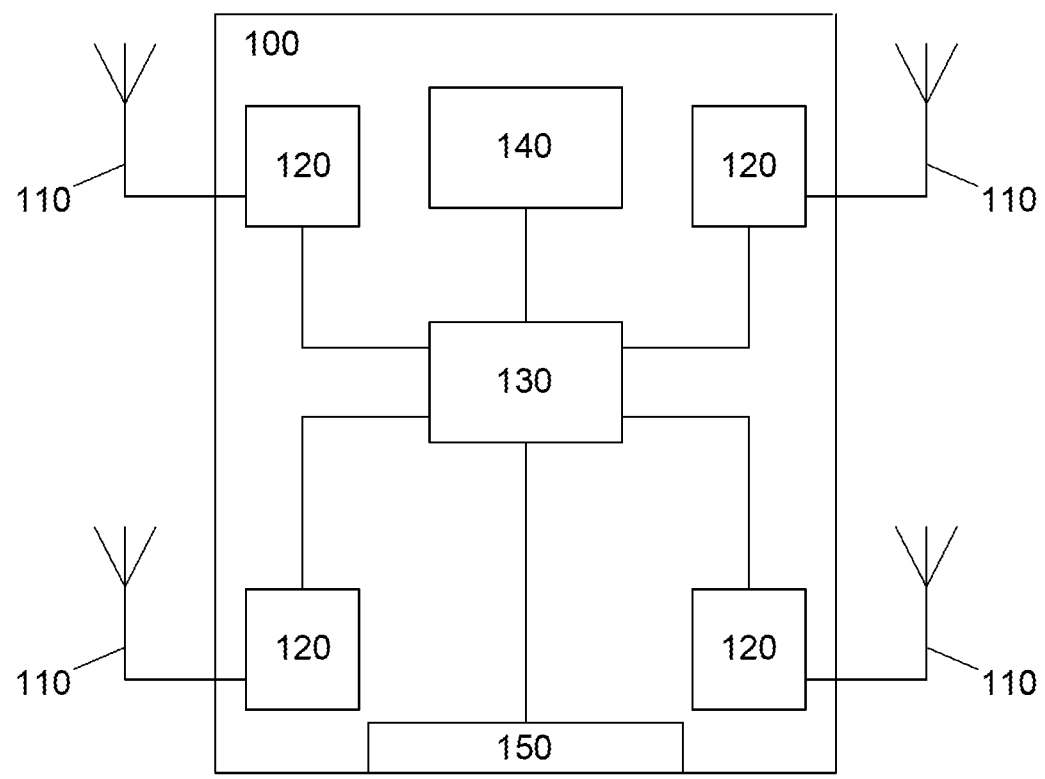
FIG. 3 shows a device according to an embodiment.

FIG. 3 shows a device 100 according to an embodiment. In an embodiment the device is a BLE device. The device comprises four antenna elements 110. Each antenna element is communicatively connected to a receiver chain 120. The receiver chain 120 processes, including digitisation, received signals and transmits them to a processor 130. The processor 130 is coupled to non-volatile memory 140. Memory 140 stores computer program instructions that, when executed, cause the processor 130 to execute program steps that implement the above described method on the basis of signals received via the antenna elements 110 and receiver chains 120. The processor 130 may be an FPGA programmed to perform a method of an embodiment or a microprocessor executing program instructions stored in memory, wherein the program instructions cause the microprocessor to perform a method of an embodiment. It will be appreciated that the process could also be comprised of adders for averaging, with other computational steps being performed by accessing look-up-tables. The memory may comprise only read-only memory that stores the inverse of matrix R and/or the look-up-tables and/or program instructions for the microprocessor. Any intermediate values arrived at during performance of the above described method may be stored in volatile buffer memory. Alternatively the memory may be read/write memory so that all of the abovementioned data can be stored in the memory as well as any intermediate values that are needed for later computational steps.

The processor 130 is moreover coupled to an output port 150 for communicating calculated angles of arrival to outside entities.

Figure 4:
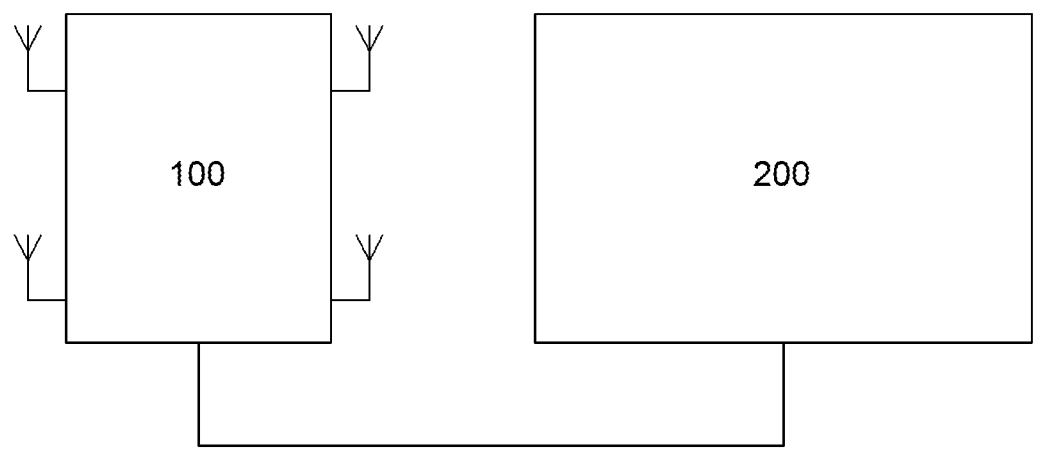
FIG. 4 shows a system employing the device of the embodiment.

FIG. 4 illustrates a system comprising the device 100, communicatively connected to a computing system 200. In the embodiment the connection between the two systems is established via output port 150 of device 100. The computing system 200 may, in one embodiment, be part of an on-board computing system of a vehicle, with the device 100 receiving and evaluating according to an embodiment signals received from tyre pressure sensors integrated in the tyres of the vehicle. As tyres are interchangeable and can rotate positions on the vehicle as they age the position of a given tyre/tyre pressure monitoring device on the vehicle at a given point in time is not necessarily known. By determining the angle of arrival of a signal received from the tyre pressure monitoring device in a tyre the computing environment 200 can determine from which tyre on the care a signal indicating, for example, under-inflation was received. Based on this information the operator of the vehicle can be given detailed instructions regarding which tyre needs to be inflated.

Other uses in vehicular environments are of course also possible. In one embodiment the computing system 200 may be part of an on-board computing system of a vehicle, with the device 100 receiving and evaluating according to an embodiment signals received from a vehicle unlocking device. Remote unlocking of cars allows an unparalleled convenience however it can introduce security vulnerabilities, especially when a key is in close proximity to the car but the user has no intention of unlocking the vehicle. By determining the angle of arrival of a signal received from an unlocking device the computing environment 200 can restrict the angles from which a vehicle can be unlocked. This is advantageous as it ensures the vehicle can only be unlocked when the user is directly in front of the vehicle door.

The computing environment may also be part of larger spaces in which the movement of signal sources is to be tracked. This may include tracking users in a given environment, for example to enable delivery of information to the user that is specific to the particular part of the environment in which the user is currently located, or for determining the location of certain objects within the environment. The angle of arrival of a signal from a given object could, for example be transmitted to a luggage tracking system in an airport or be used to determine where in a shop a given item is located. In these cases the computing environment 200 would be the or part of the luggage handling system of the airport or part of or they stock monitoring system of a shop.

Figure 5:
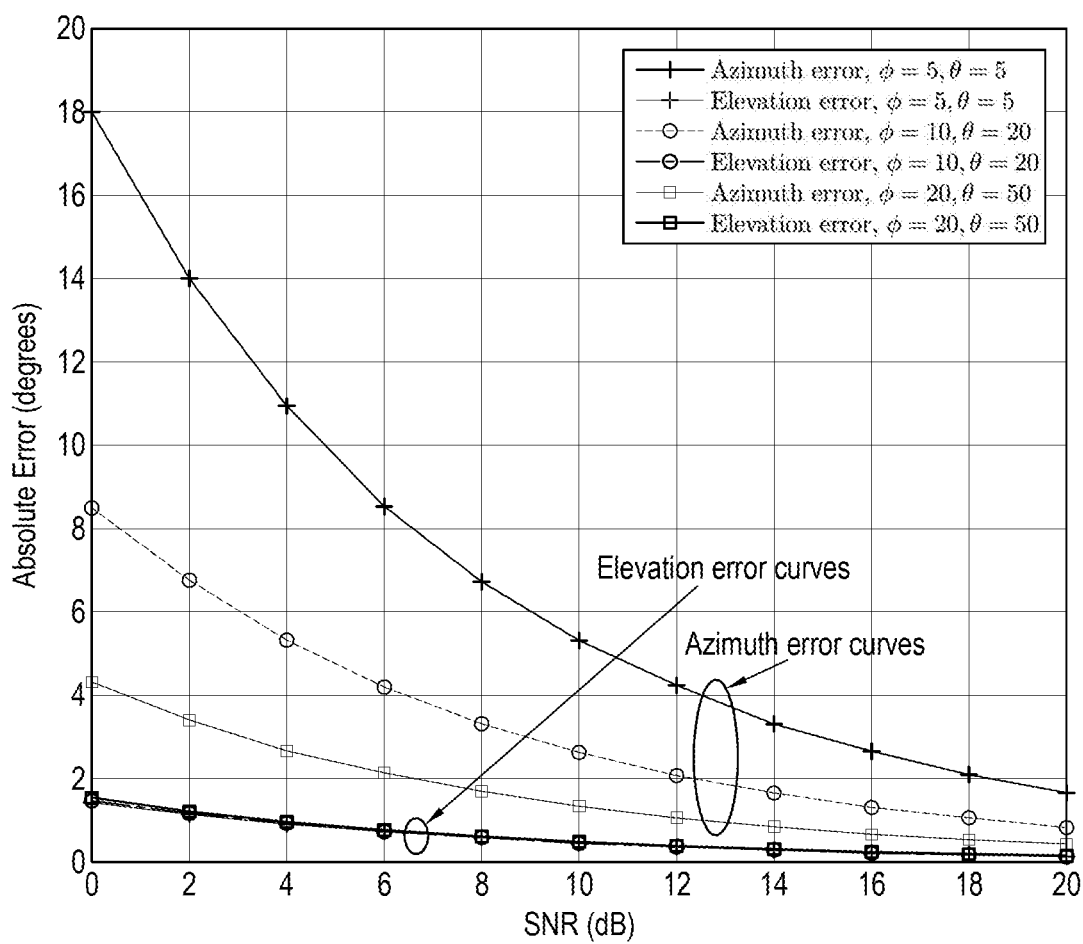
FIG. 5 shows absolute error curves provided by an embodiment.

In FIG. 5, the absolute error in azimuth and elevation angles estimation achieved using the embodiment is plotted. The actual azimuth and elevation angles are varied and the performance analysed. The plots indicate that the error in the angle estimation is always less than 2 degrees. The azimuth error is dependent on the actual azimuth angle and decreases with increasing signal-to-noise ratio. The performance of the embodiment is comparable to the solution of the Bartlett algorithm.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of determining a direction of arrival of a reception signal at a device comprising a first antenna element and a second antenna element, at least partially performed by a processor of the device configured to:
   calculate a first statistical signal for a first antenna element and a second statistical signal for a second antenna element based on signals received at the first antenna element and the second antenna element over N time slots;
   determine respective phases of the first statistical signal and the second statistical signal;

determine at least one of an azimuth or elevation angle of the reception signal using the phases and information of locations of the first antenna element and the second antenna element;

define, as at least one of two candidate azimuth or elevation angles, (1) a determined at least one of azimuth or elevation angle and (2) an angle spaced apart from the determined at least one of azimuth or elevation angle by 180 degrees; and use a spectral-based direction finding algorithm or a parametric-based direction finding algorithm to decide between at least one of the two candidate azimuth angles or the two candidate elevation angles.

2. The method according to claim 1, wherein the statistical signal is calculated as a weighted average signal of a signal received over the N time slots, wherein values of the signal received over the N time slots are not identical.

3. The method according to claim 1, further comprising forming signal-to-noise ratios of statistical signals received through different antenna elements and determining the phases based on the ratios.

4. The method according to claim 1, further comprising outputting a determined angle of arrival of the reception signal to a computing system.

5. A method of determining a direction of arrival of a reception signal at a device comprising a first antenna elements and a second antenna elements, at least partially performed by a processor of the device configured to:

calculate a first statistical signal for a first antenna element and a second statistical signal for a second antenna element based on signals received at the first antenna element and the second antenna element over N time slots;

determine respective phases of the first statistical signal and the second statistical signal; and determine at least one of an azimuth or elevation angle of the reception signal using the phases and information of locations of the first antenna element and the second antenna element, wherein values of a signal received over the N time slots are identical.

6. A method of determining a direction of arrival of a reception signal at a device comprising a first antenna elements and a second antenna elements, at least partially performed by a processor of the device configured to:

calculate a first statistical signal for a first antenna element and a second statistical signal for a second antenna element based on signals received at the first antenna element and the second antenna element over N time slots;

determine respective phases of the first statistical signal and the second statistical signal; and determine at least one of an azimuth or elevation angle of the reception signal using the phases and information of locations of the first antenna element and the second antenna element, wherein the information of the locations is provided in a matrix and wherein a vector comprising the phases of is left-multiplied with a pseudo inverse of the matrix.

7. A device comprising a first antenna elements and a second antenna elements, and a processor configured to:

calculate a first statistical signal for a first antenna element and a second statistical signal for a second antenna element based on signals received at the first antenna element and the second antenna element over N time slots;

determine respective phases of the first statistical signal and the second statistical signal;

determine at least one of an azimuth or elevation angle of the reception signal using the phases and information of locations of the first antenna element and the second antenna element;

define, as two candidate azimuth angles, a determined azimuth angle and an angle spaced apart from the determined azimuth angle by 180 degrees; and use a spectral-based direction finding algorithm or a parametric-based direction finding algorithm to decide between the candidate azimuth angles.

8. The device according to claim 7, the processor further configured to:

form signal-to-noise ratios of the values corresponding to the signals received through different antenna elements; and determine phase based on the ratios.

9. The device according to claim 7, further comprising an output for outputting a determined angle of arrival of the signal to a computing system.

10. A device comprising a first antenna elements and a second antenna elements, and a processor configured to:

calculate a first statistical signal for a first antenna element and a second statistical signal for a second antenna element based on signals received at the first antenna element and the second antenna element over N time slots;

determine respective phases of the first statistical signal and the second statistical signal; and determine at least one of an azimuth or elevation angle of the reception signal using the phases and information of locations of the first antenna element and the second antenna element, wherein the information of the locations of the antenna elements is provided in a matrix and stored in said memory and wherein a vector comprising the phases of the values is left-multiplied with a pseudo inverse of the matrix.

* * * * *